United States Patent [19]

Cirino

[11] Patent Number: 5,704,741
[45] Date of Patent: Jan. 6, 1998

[54] VALVE SEAT TOOL

[75] Inventor: John M. Cirino, Waite Hill, Ohio

[73] Assignee: Master Tool Corporation, Grand River, Ohio

[21] Appl. No.: 579,554

[22] Filed: Dec. 27, 1995

[51] Int. Cl.$^6$ ............................................. B23B 29/02
[52] U.S. Cl. ........................ 408/146; 408/232; 408/233; 407/46
[58] Field of Search .................... 408/83.5, 146, 408/189, 191, 197, 231, 232, 233, 713; 407/46, 47, 48, 49

[56] References Cited

U.S. PATENT DOCUMENTS

| 2,253,028 | 8/1941 | Hassig ........................ 407/46 |
| 3,351,998 | 11/1967 | Theiler ........................ 408/713 |
| 3,371,397 | 3/1968 | Coleshill et al. ........... 407/46 |
| 4,964,763 | 10/1990 | Kieninger ................... 407/46 |
| 5,288,182 | 2/1994 | Patterson et al. . |

FOREIGN PATENT DOCUMENTS

| 2204137 | 8/1973 | Germany ..................... 408/713 |
| 2609617 | 9/1977 | Germany ..................... 408/231 |
| 2906840 | 8/1980 | Germany ..................... 408/713 |

*Primary Examiner*—Daniel W. Howell
*Attorney, Agent, or Firm*—Fay, Sharpe, Beall, Fagan, Minnich & McKee

[57] ABSTRACT

A valve seat tool assembly has a body adapted for selective rotation about a longitudinal axis. The body includes recesses that receive removable cartridges therein. Preferably, the cartridges have a cylindrical shank received in the recesses and carry cutting inserts on each cartridge. The cartridge and cutting inserts may be mounted in any of three desired manners, all of which advantageously permit axial adjustment of the cartridge relative to the body.

13 Claims, 2 Drawing Sheets

5,704,741

VALVE SEAT TOOL

BACKGROUND OF THE INVENTION

This invention pertains to the art of cutting tools and, more particularly, to rotary cutting tools. The invention is applicable to a valve seat tool that employs replaceable cartridges that carry a cutting insert, a cylindrical shank of the cartridge being adapted for receipt in a body recess of the valve seat tool and being substantially encompassed by the body for strength and rigidity and will be described with particular reference thereto. It will be appreciated, however, that the invention has broader applications and may be advantageously employed in related valve seat tools having similar configurations and applications.

There are at least two primary concerns with a valve seat tool. First, the assembly must have a desired strength, particularly where removable cartridges carrying cutting inserts are involved. The use of removable cartridges allows a new cutting surface to be inserted onto the tool when the original cutting edge has become dull. Aside from concerns regarding accuracy of placement and positioning, a strong interconnection is required between the cartridge and body so that forces are effectively transferred therebetween.

In a related manner, it is critical to control the angles in the valve seat. Accordingly, the ability to control the angles of the cutting tool is highly desirable and must be evaluated in the design of valve seat tools.

Prior designs are believed deficient in one manner or another. Thus, there is a continuing search for an effective structural arrangement that achieves these objectives.

SUMMARY OF THE INVENTION

The present invention contemplates a new and improved valve seat tool that overcomes the above-referenced problems and others using a round or cylindrical shank tool that provides a secure mounting and desired strength to the assembly so that precise valve seat angles can be achieved.

According to a more limited aspect of the invention, a cylindrical shank extends from one end of the cartridge and is enclosed in a body recess. A cutting insert is mounted in a second end of the cartridge and extends radially outward from the cartridge and body and thereby is adapted for cutting a valve seat. A securing means for interconnecting the cartridge and insert to the body is also provided.

According to yet another aspect of the invention, the securing means includes a first fastener that secures the insert to the cartridge and a second fastener that secures the cartridge to the body.

According to an alternate aspect of the invention, the securing means includes a first fastener for securing the insert to the cartridge and a wedge member that abuttingly engages and urges the cartridge against the body.

According to a third preferred aspect of the invention, the securing means includes a common wedge member having a surface that urges both the cartridge and the insert against the body.

According to a still further aspect of the invention, adjusting means for altering the axial location of the cartridge relative to the body is also provided.

A principal advantage of the invention is found in the ability to easily replace a cutting insert by removing a cartridge from the body.

Yet another advantage of the invention resides in the added strength that provides an accurate cutting angle as desired in valve seat tooling.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in detail in this specification and illustrated in the accompanying drawings which form a part hereof, and wherein.

DETAILED DESCRIPTION OF THE PREFERRED EMBODIMENTS

Figure 1:
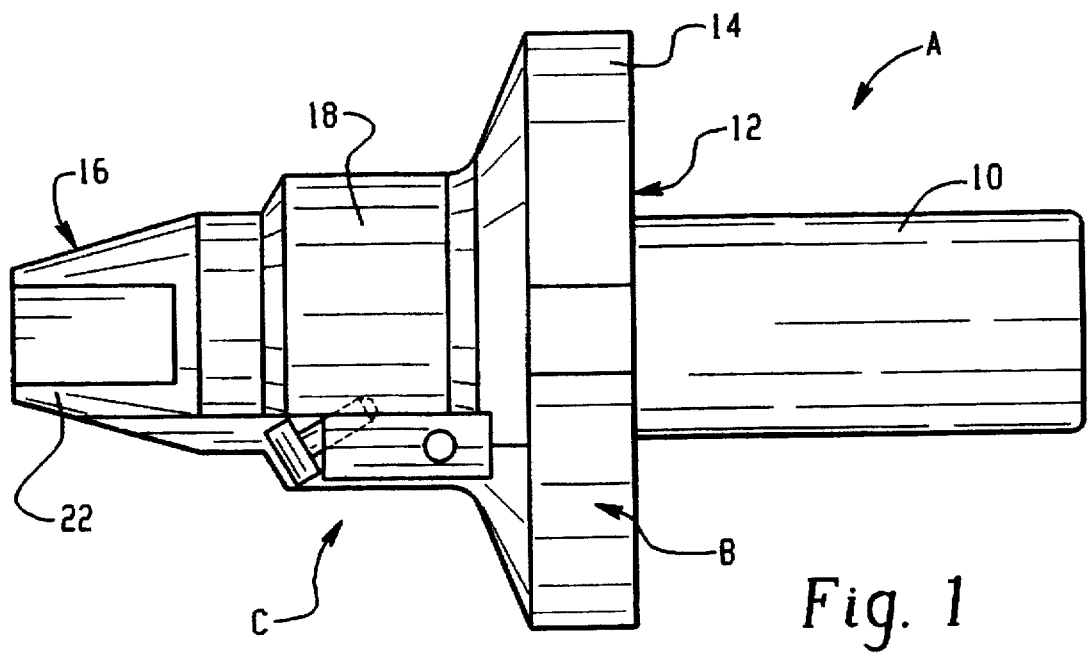
FIG. 1 is an elevational view of a body portion of a valve seat tool adapted for connection to a work spindle (not shown)

Referring now to the drawings wherein the showings are for the purposes of illustrating the preferred embodiments of the invention only and not for purposes of limiting same, the FIGURES show a valve seat tool assembly A that includes a body B adapted for location about a longitudinal axis in response to rotation of a spindle (not shown) to which the body is mounted. At least one, and preferably three, removable cartridges C are secured to the body to provide precision cutting surfaces for forming valve seats in an engine head (not shown).

Figure 2:
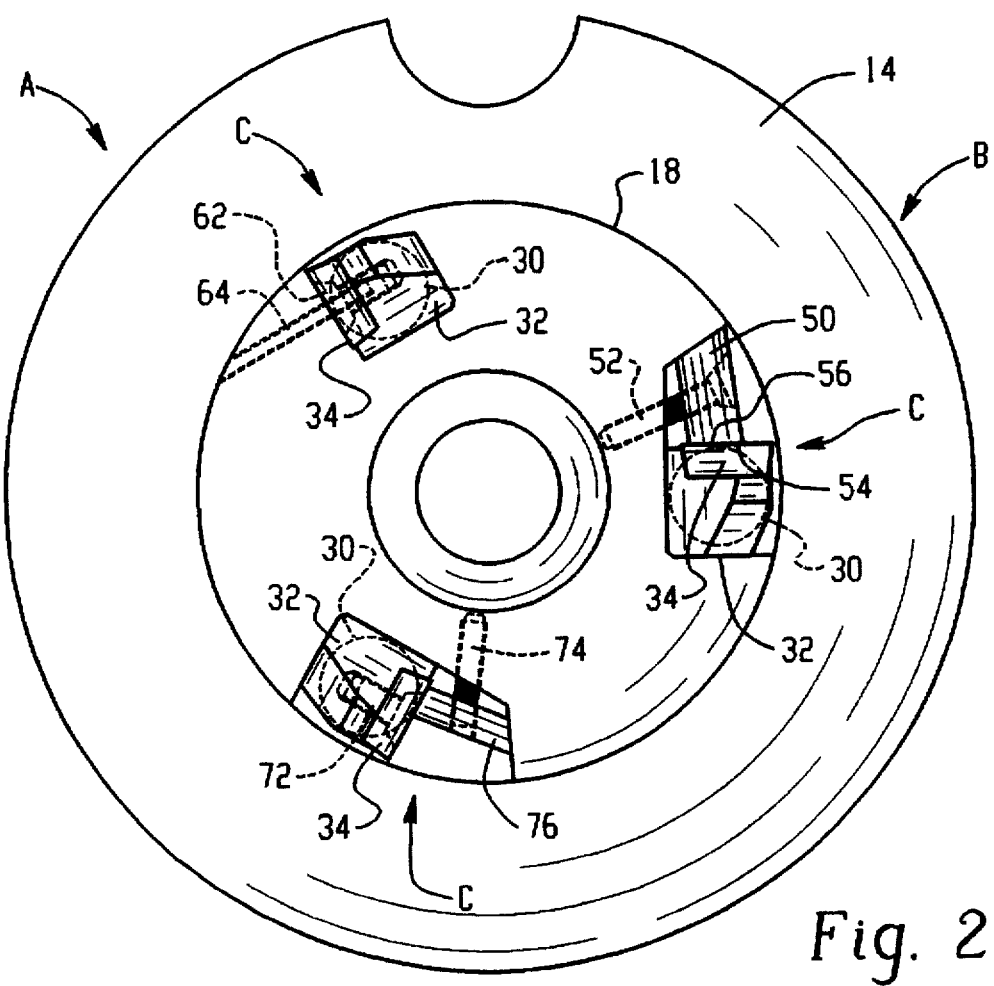
FIG. 2 is an enlarged elevational view taken generally from the left-hand of FIG. 1.
Figure 6:
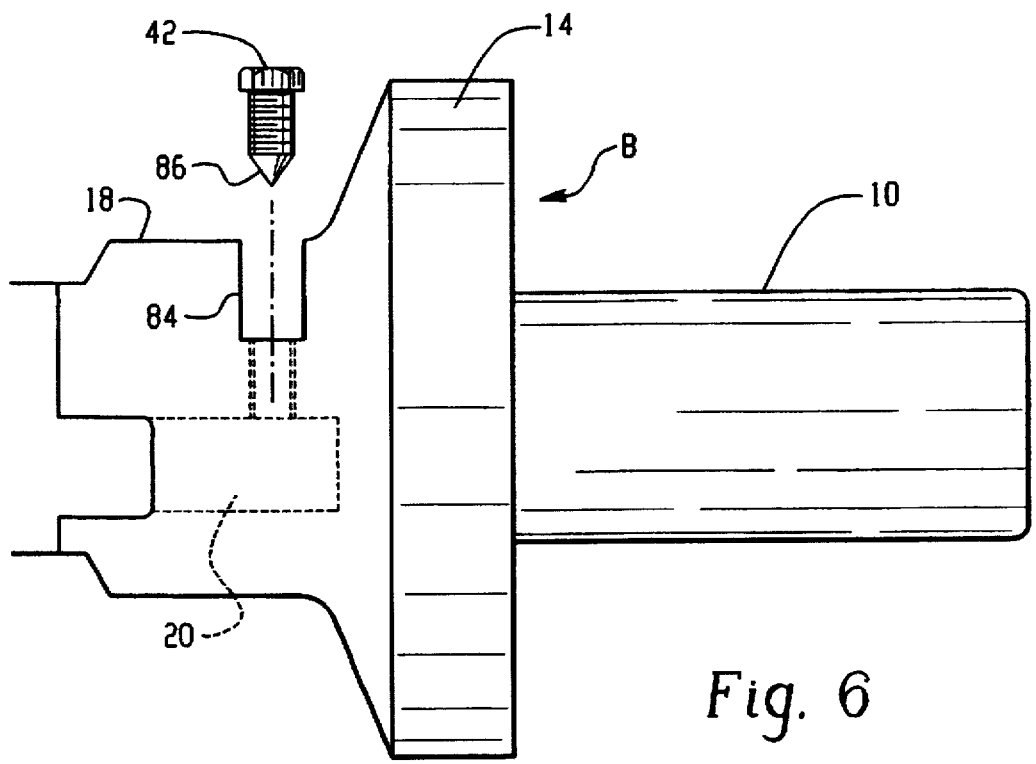
FIG. 6 is an elevational view more particularly illustrating the adjustability of a cartridge relative to the body.

More particularly, and with reference to FIGS. 1 and 2, the body B includes an elongated mounting shank 10 extending axially from one end 12 of the body. As shown, the mounting shank is preferably cylindrical in configuration, and may be secured to a work spindle in any one of many known, desired manners. An enlarged shoulder 14 is disposed in an intermediate region of the body, between the shank and on outer end 16 of the body. The shoulder limits insertion of the mounting shank into the work spindle and provides the desired mass and strength to the rotating body during the cutting operation. A reduced diameter region or land 18 is disposed on the opposite side of the shoulder from the mounting shank. Three axial recesses 20, one of which is shown in phantom in FIG. 6, are provided in the land 18. Each recess is adapted to receive a cylindrical shank of a removable cartridge as will be described in greater detail below.

A nose portion 22 of the body tapers to a minimum diameter at the second end 16. As will be appreciated, the second end is dimensioned for receipt in an opening of an engine head (not shown) in which the valve seats are formed or cut by the tool.

Figure 4:
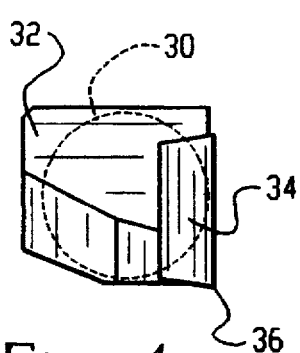
FIG. 4 is an elevational view taken generally of the left-hand end of the cartridge of FIG. 4.
Figure 3:
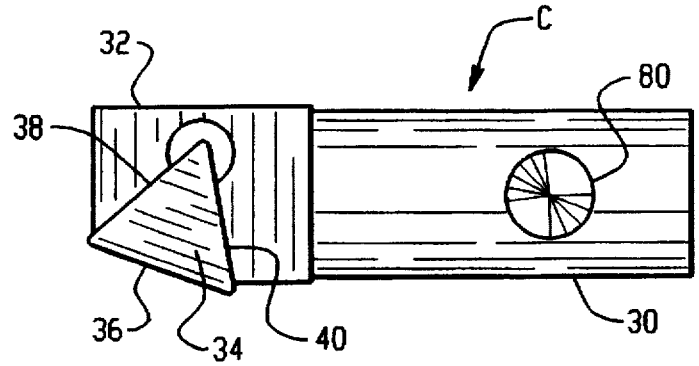
FIG. 3 is an enlarged view of a preferred form of replaceable cartridge adapted for receipt in a valve seat tool body.
Figure 5:
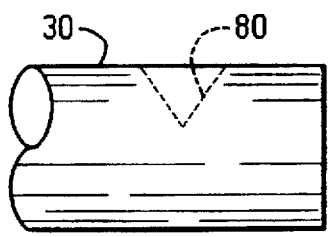
FIG. 5 is an elevational view of a shank portion of the replaceable cartridge of FIG. 3 and particularly illustrating a portion of the adjusting means.

A preferred form of cartridge is individually illustrated in FIGS. 3–5. As will be understood, each cartridge is preferably identical to the other so that description of one applies to the other two cartridges unless specifically noted otherwise. The cartridge includes an elongated cylindrical shank 30 at one end and an insert receiving area or head 32 at the other end. As shown, the shank is of a slightly smaller diameter than the head received on one end of the shank. A cutting insert 34 is adapted for receipt in a similarly configured region of the cartridge head. The cutting insert preferably has at least one sharpened cutting edge 36 that is adapted to extend radially outward from both the cartridge and the body B so as to form a valve seat and a desired cutting angle in the engine block. If desired, the insert may have multiple cutting edges, each of which can be selectively positioned at the desired cutting angle. For example, additional cutting edges 38, 40 are shown on the insert in FIG. 3. Due to the triangular configuration of the insert, a selected cutting edge can be positioned as shown at any one time to perform the valve seat cutting. Once that cutting edge is worn, the insert is merely rotated to present a new sharpened edge for the cutting operation. As best represented in FIG. 2, the cartridges are peripherally or circumferentially spaced about the land 18. Preferably, they are equispaced about the periphery and the cutting edge of each cartridge extends radially outwardly from the external surface of the land.

The shank 30 of each cartridge is closely received within an associated recess 20 of the body. The recess and shank are dimensioned so that the shank is completely encapsulated within the recess. The shank is axially advanced into the recess until the head and cutting insert are properly located relative to the body. A threaded member such as screw 42 cooperates with a securing means to be described below to accurately locate the cartridge in the body.

Three preferred manners of securing the cutting insert to the cartridge, and likewise the cartridge to the body, are shown. Each arrangement is compatible with the cylindrical shank recess mounting assembly described above. Particularly, and with specific reference to FIG. 2, a first preferred mounting arrangement (shown at the three-o'clock position) uses a single wedge 50 held in place by a fastener 52 to hold both the insert and the cartridge in place. That is, one face 54 of the wedge member abuttingly engages a planar face 56 of the insert. As the fastener 52 is tightened into the body, the wedge member is drawn radially inwardly so that faces 54, 56 tightly abut one another. The insert, in turn, is tightly press-fit against the cartridge so that a single fastener, in conjunction with a wedge, holds both the insert and cartridge to the body.

Accordingly to a second preferred arrangement (shown at the eleven-o'clock position), the insert 34 is secured by a first fastener 62 to the cartridge C. The cartridge, carrying the insert, is then secured to the body by means of a second fastener 64. Thus, no wedge is used in this second preferred manner of securing the insert and cartridge.

According to a third preferred arrangement (shown at the seven-o'clock position), the insert is secured to the cartridge by a first fastener 72. A second fastener 74 does not pass through the cartridge directly. Rather, the second fastener 74 cooperates with a wedge 76 which abuttingly engages and tightly holds the cartridge in a press-fit relation, urging it radially inward toward the body.

Again, all three versions or styles of the insert and cartridge mounting arrangement can be used with the desired cylindrical shank and body recess mounting arrangement. Typically, it is believed that a particular application will employ the same type of securing arrangement for all three cartridges. However, it is not beyond the scope of this invention to employ more than one securing arrangement in a particular application.

As further illustrated in FIGS. 4-6, an axial adjustment of the cartridge relative to the body can also be provided. Since all three insert and cartridge mounting arrangements described above employ the cylindrical shank and recess arrangement, it will be understood that this axial adjustment is adaptable to all three of the preferred arrangements shown in FIG. 2. More specifically, a conical region 80 is provided in the shank 30 of the cartridge. The conical arrangement cooperates with an adjustment member such as screw threaded member 42 that extends through a radial opening 84 in the body. As the screw threaded member 42 is advanced inwardly toward the body, an inner end 86 thereof cooperates with the conical region to advance or retract the shank of the cartridge generally along a longitudinal axis due to the angled surface of the conical region. This provides for desired axial adjustability of the cartridge relative to the body, a feature which is particularly important since close tolerances are required in the valve seat cutting process.

The invention has been described with reference to the preferred embodiments. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A valve seat tool assembly comprising:
   a body adapted for selective rotation about a longitudinal axis relative to a workpiece, the body having a recess formed therein and being opened at one end;
   a cartridge having a shank extending from a first end and being completely enclosed in the body recess, the cartridge including a cutting insert at a second end of the cartridge and extending radially outward from the cartridge and the body for cutting a workpiece; and
   a common wedge member that abuttingly engages both the cartridge and insert against the body.

2. The valve seat tool as defined in claim 1 further comprising a means for adjusting the axial location of the cartridge relative to the body.

3. The valve seat tool as defined in claim 2 wherein the adjusting means includes a conical region in the cylindrical shank of the cartridge, an opening extending substantially radially through the body and communicating with the conical region, and a threaded member that is radially advanced and retracted through the opening and having a first end that engages the conical region to achieve axial adjustment of the cartridge relative to the body.

4. The valve seat tool as defined in claim 1 further comprising a first fastener for securing the insert to the cartridge and the cartridge is secured to the body by a second fastener.

5. The valve seat tool as defined in claim 1 further comprising a first fastener for securing the insert to the cartridge and the cartridge is secured to the body by the wedge member.

6. A rotary tool for cutting valve seats in an engine block, the tool comprising:
   a body having a longitudinal axis about which the body is adapted for rotation, the body including a generally cylindrical recess extending parallel to the longitudinal axis;
   a cartridge having a cylindrical shank with a conical region extending axially from a first end of the cartridge, the shank being completely received and enclosed in the body recess to add strength and rigidity to the mounting of the cartridge whereby controlled angles can be maintained in the valve seat cutting process;

a replaceable cutting insert removably mounted on a second end of the cartridge, the cutting insert having an edge that extends outwardly from the body and cartridge for engaging a cutting surface on the engine block;

a radial opening in the body communicating with the recess and the cartridge shank; and an adjustment member threadably received in the radial opening and abutting the conical region of the shank to selectively adjust the axial position of the cartridge and cutting insert.

7. The valve seat tool as defined in claim 6 wherein the securing means includes a first fastener for securing the insert to the cartridge and the cartridge is secured to the body by a second fastener.

8. The valve seat tool as defined in claim 6 wherein the securing means includes a first fastener securing the insert to the cartridge and the cartridge is secured to the body by a wedge member having a surface that abuttingly engages and urges the cartridge against the body.

9. The valve seat tool as defined in claim 6 wherein the securing means includes a common wedge member that has a surface that abuttingly engages both the cartridge and the insert against the body.

10. A valve seat tool assembly comprising:

a body adapted for selective rotation about a longitudinal axis relative to a workpiece, the body having a recess formed therein and being opened at one end;

a cartridge having a shank extending from a first end and being completely enclosed in the body recess, the cartridge including a cutting insert at a second end of the cartridge and extending radially outward from the cartridge and the body for cutting a workpiece;

means for securing the cartridge and insert to the body; and a conical region in the cylindrical shank of the cartridge, an opening extending substantially radially through the body and communicating with the conical region, and a threaded member that is radially advanced and retracted through the opening and having a first end that engages the conical region to provide axial adjustment of the cartridge relative to the body.

11. The valve seat tool as defined in claim 10 wherein the securing means includes a first fastener for securing the insert to the cartridge and the cartridge is secured to the body by a second fastener.

12. The valve seat tool as defined in claim 10 wherein the securing means includes a first fastener for securing the insert to the cartridge and the cartridge is secured to the body by a wedge member having a surface that abuttingly engages and urges the cartridge against the body.

13. The valve seat tool as defined in claim 10 wherein the securing means includes a common wedge member that has a surface that abuttingly engages both the cartridge and the insert against the body.

* * * * *